United States Patent [19]

Geiser

[11] 3,937,856

[45] Feb. 10, 1976

[54] REHABILITATION OF WATER-DAMAGED ELECTRICAL EQUIPMENT

[75] Inventor: Edward M. Geiser, Downers Grove, Ill.

[73] Assignee: Universal Oil Products Company, Des Plaines, Ill.

[22] Filed: Nov. 16, 1973

[21] Appl. No.: 416,548

[52] U.S. Cl. .................. 427/58; 427/142; 427/116; 427/421; 134/31; 134/40; 252/118; 252/153; 252/546

[51] Int. Cl.$^2$ ........................................... B23P 7/00

[58] Field of Search ........ 134/31, 40; 252/118, 153, 252/170, 546; 117/201; 427/140, 142, 421, 58, 116

[56] References Cited

UNITED STATES PATENTS

| | | | |
|---|---|---|---|
| 2,541,703 | 2/1951 | K'Burg | 134/40 |
| 2,866,726 | 12/1958 | Vance | 134/40 X |
| 3,003,247 | 10/1961 | Sherliker | 252/153 X |
| 3,607,383 | 9/1971 | de Vroome | 252/546 X |
| 3,673,097 | 6/1972 | de Vroome | 252/118 X |

OTHER PUBLICATIONS

The Condensed Chemical Dictionary, Reinhold Publishing Corporation, C. 1966.

*Primary Examiner*—Ralph S. Kendall
*Assistant Examiner*—John D. Smith
*Attorney, Agent, or Firm*—James R. Hoatson, Jr.; Raymond H. Nelson; William H. Page, II

[57] ABSTRACT

Water-damaged electrical equipment is rehabilitated by treatment with a bath comprising a paraffinic oil, a polymethyl aromatic compound, a salt formed from the reaction of an N-alkyl polymethylenediamine and a dimer acid, and an inert organic solvent.

10 Claims, No Drawings

REHABILITATION OF WATER-DAMAGED ELECTRICAL EQUIPMENT

This invention relates to a method for the rehabilitation of water-damaged electrical equipment. More specifically, this invention relates to a method for the rehabilitation of water-damaged electrical equipment which comprises the treatment of said equipment with a bath comprising a paraffinic oil, a polymethyl aromatic compound, a salt formed from the reaction of an N-alkyl polymethylenediamine and a dimer acid, and an inert organic solvent.

It has been shown in the prior art that electrical equipment which has been immersed in water, whether it be a result of high tides (salt water) or flood waters, must normally be dismantled, thoroughly cleaned, oven dried, and reassembled in order to complete rehabilitation. It has now been discovered that such procedures may no longer be necessary in view of the fact that said damaged electrical equipment may be treated without dismantling, oven drying, and reassembling by virtue of treatment with the hereinafter described novel bath. The utilization of the above-mentioned bath will allow areas which have been subjected to severe flooding a more inexpensive and faster means of rehabilitating crucial electrical equipment necessary in major disaster areas. The utilization of the above-mentioned will allow for a more thorough cleaning by a displacement of all moisture with various aspects of the hereinafter described bath, said cleaning will be performed in the most minute cracks and crevices of the damaged equipment.

The bath of the method of this invention, namely, a paraffinic oil, a polymethyl aromatic compound, a salt formed from the reaction of an N-alkyl polymethylenediamine and a dimer acid, and an inert organic solvent may be utilized for the revitalization of wet-electrical equipment for on-site use in the situations of emergency which may warrant such use.

It is therefore an object of this invention to provide a method for the rehabilitation of water-damaged electrical equipment.

A further object of this invention is to provide a method for the rehabilitation of water-damaged electrical equipment utilizing a bath comprising certain compositions of matter which will permit the recovery of the rehabilitated electrical equipment in a more expedient manner.

In one aspect an embodiment of this invention resides in a process for the rehabilitation of water-damaged electrical equipment which comprises the treatment of said equipment with a bath comprising a paraffinic oil, a polymethyl aromatic compound, a salt formed from the reaction of N-alkyl polymethylenediamine and a dimer acid, and an inert organic solvent at treatment conditions, and recovering the resultant rehabilitated electrical equipment.

A specific embodiment of this invention resides in a method for treatment of water-damaged electrical equipment comprising relays, switch gears, motor controls, motors and armatures which comprises treating said water-damaged electrical equipment with a bath comprising 25.0 percent by weight of a paraffinic oil possessing a Saybolt Universal Second value of 100 at 100° F., 25.0 percent of p-xylene, 10.0 percent of a salt formed from the reaction of 1 equivalent of N-propyl-1,3-propylenediamine with 1 equivalent of malonic acid, and 40.0 percent of a coal tar naphtha possessing a boiling point of 320° F. at a temperature in the range of from about 35° F. to about 50° F. and a pressure of about 1 atmosphere and recovering the rehabilitated electrical equipment comprising relays, switch gears, motor controls, motors, and armatures.

A second specific embodiment of this invention resides in a method for treating water-damaged electrical equipment comprising relays, switch gears, motor controls, and armatures with a bath comprising 20.0 percent by weight of a paraffinic oil possessing a Saybolt Universal Second value of 95 at 100° F. as determined by ASTM test No. D-88, 20.0 percent by weight of pseudocumene, 10.0 percent by weight of a salt formed from the reaction of 1 equivalent of N-n-butyl-1,6-hexylenediamine with 1 equivalent of oxalic acid and 45.0 percent by weight of naphthalene at a temperature of 75° F. and a pressure of 1 atmosphere and recovering the resultant rehabilitated electrical equipment comprising relays, switch gears, motor controls, motors, and armatures.

Other objects and embodiments will be found in the following further detailed description of the present invention.

As hereinbefore set forth the present invention is concerned with a method for the treatment of water-damaged electrical equipment, said method being effected by treatment of the water-damaged electrical equipment with a bath comprising a paraffinic oil, a polymethyl aromatic compound, a salt formed from the reaction of an N-alkyl polymethylenediamine and a dimer acid, and an inert organic solvent. The treatment is effected under conditions which include a temperature in the range of from about 35° F. to about 90° F. and a pressure of from atmospheric to about 100 atmospheres. Another variable which is employed in the present invention is the amount of different components which comprise the treating bath. The paraffinic oil comprises from about 5.0 percent to about 40.0 percent by weight of the bath, the polymethyl aromatic compound comprises from about 10.0 to about 29.0 percent by weight of the bath, the salt formed from the reaction of an N-alkyl polymethylenediamine and a dimer acid comprises from about 1.0 percent to about 10.0 percent by weight of the bath and the inert organic solvent comprises from about 40.0 percent to about 65.0 percent by weight of the bath. It should be noted that the different variables of the weight percentages of the different components may be varied to any extreme within the above set forth limitations and that no specific limitations hereinafter cited is conclusive as to the percentages comprising the bath.

Examples of paraffinic oils which may be employed in the bath of the present invention will comprise all paraffinic oils possessing a Saybolt Universal Second value of 110 to a Saybolt Universal Second value of 90 measured at 100° F. by ASTM test No. D-88. Suitable examples of polymethyl aromatic compounds which may be employed in the bath of the present invention will include o-xylene, m-xylene, p-xylene, 1,2,3-trimethylbenzene, pseudocumene, 1,2,5-trimethylbenzene, 1,2,3,4-tetramethylbenzene, 1,2,3,4,5-pentamethylbenzene, 1,2,3,4,5,6-hexamethylbenzene, etc. Suitable examples of salts which may be employed in the bath of the present invention will include any salt formed from the reaction of an N-alkyl polymethylenediamine with a dimer acid, such as the reaction of N-propyl-1,3-propylenediamine with malonic acid, N-n-amyl-1,3-propylenediamine with acetylene dicarboxylic acid, N-n-butyl-1,6-hexylenediamine with oxalic acid, N-tallow-1,3-propylenediamine and a mixture of fatty acids and polymerized olefinic acids, commonly known as VR-1 acid or D50 MEX acid, having a carbon range of from about 25 carbon atoms to about 100 carbon atoms, etc. The reaction in which the salt is formed from the reaction of an N-alkyl polymethylenediamine and a dimer acid may be effected before composition of the bath, or if desired, in situ, said components being present in the range of about 1 equivalent of the N-alkyl polymethylenediamine to about 1 equivalent of the dimer acid. Examples of suitable inert organic solvents which may be employed in the bath of the present invention will comprise any organic solvent which is inert to the bath such as n-pentane, n-hexane, n-heptane, n-octane, isooctane (2,2,4-trimethylpentane), benzene, toluene, naphthalene, anthracene, naphtha solvent, coal tar naphtha solvents possessing boiling points from about 300° F. to about 400° F., etc.

It is understood that the aforementioned paraffinic oils, polymethyl aromatic compounds, N-alkyl polymethylenediamines, dimer acids and inert organic solvents are only representative of the class of compounds which may be employed in the bath and that the present invention is not necessarily limited thereto.

The process of this invention may be effective in a suitable batch type operation. For example, when a batch type operation is employed, the water-damaged electrical equipment is thoroughly rinsed with clean fresh water to remove any salt, dirt or slime and subsequently immersed or treated with the bath comprising the paraffinic oil, the polymethyl aromatic compound, the salt formed from the reaction of an N-alkyl polymethylenediamine and a dimer acid, and an inert solvent. After a predetermined period of time, the treatment of the bath is terminated and the equipment is allowed to stand for a period of time up to about 24 hours before placing into service. It is also contemplated within the scope of the batch type operation that the water-damaged electrical equipment may be treated with the bath through the utilization of an aerosol spray. When such aerosol spray is used, the bath comprising the paraffinic oil, the polymethyl aromatic compound, the salt formed from the reaction of an N-alkyl polymethylenediamine and a dimer acid and an inert organic oxide is placed in a pressured container, said pressure resulting from the presence of a substantially inert gas such as the freons, nitrogen or helium. The bath is applied to the electrical equipment through use of a spray from the aerosol by means of the directed partial pressure emittance from the top of the can.

Examples of basic types of electrical equipment which may be rehabilitated would include relays, switch gears, motor controls, motors, and armatures.

The following examples are given to illustrate the method of the present invention which, however, are not intended to limit the generally broad scope of the present invention in strict accordance therewith.

EXAMPLE I

In this example a bath is prepared by the mixture of 25.0 percent by weight of a paraffinic oil possessing a Saybolt Universal Second value of 100 at 100° F. as measured by ASTM test No. D-88, 25.0 percent of p-xylene, 10 percent by weight of a salt formed from the reaction of 1 equivalent of N-propyl-1,3-propylenediamine with 1 equivalent of malonic acid, and 40.0 percent by weight of coal tar naphtha possessing a boiling point of 320° F. Electrical equipment consisting of relays, switch gears, motor controls, motors, and armatures are immersed in a salt water bath and subsequently left to stand for a period of time comprising 3 hours. After the completion of the 3-hour period of time, the electrical equipment is immersed in a vessel of clean fresh water 3 repetitive times within a 10 minute period of time. After treatment with the clean fresh water, the electrical equipment is then immersed in the bath prepared as hereinbefore set forth for a period of time comprising 25 minutes at a temperature of 40° F. and a pressure of 1 atmosphere. At the end of this time the electrical equipment is removed from the bath and left to stand for a period of time comprising 24 hours. After the passage of the 24-hour period of time, the electrical equipment is tested, said tests indicate that the equipment is rehabilitated.

EXAMPLE II

In this example a bath is prepared by a mixture of 13.5 percent by weight of a paraffinic oil possessing a Saybolt Universal Second value of 100 at 100° F. as determined by ASTM test No. D-88, 29.0 percent by weight of o-xylene, 7.5 percent of a salt formed from the reaction of 1 equivalent of N-n-amyl-1,3-propylenediamine with 1 equivalent of acetylene dicarboxylic acid, and 50.0 percent by weight of a coal tar naphtha possessing a boiling point of 320° F. Electrical equipment consisting of relays, switch gears, motor controls, motors, and armatures are submerged in a slime liquid bath for a period of time comprising 1 hour and left to stand for a period of time comprising 2 hours. At the end of this period of time the electrical equipment is immersed in a clean fresh water bath 3 repetitive times in a time period of 15 minutes. After the 15 minutes, the electrical equipment is then immersed in the above set forth bath for a period of time comprising 2 hours at a temperature of about 75° F. After the period of 2 hours, the electrical equipment is removed from the bath and left to stand for a period of time comprising 18 hours. After the 18-hour period of time the equipment is tested, said tests indicate that the electrical equipment is rehabilitated.

EXAMPLE III

A bath is prepared by the mixture of 20 percent by weight of a paraffinic oil possessing a Saybolt Universal Second value of 95 at 100° F. as determined by ASTM test No. D-88, 20.0 percent by weight of pseudocumene, 10 percent by weight of a salt formed by the reaction of 1 equivalent of N-n-butyl-1,6-hexylenediamine with 1 equivalent of oxalic acid, and 50 percent by weight of naphthalene, said bath being held in a pressurized aerosol container under a blanket of nitrogen pressure. A small electronic hand-held calculator is submerged in salt water for a period of time comprising 1 hour. The calculator is then repetitively submerged in a clean fresh water bath over a period of time comprising 20 minutes. At the end of this 20-minute period of time, the small hand-held calculator is sprayed through the use of the aerosol can with the bath as above set forth and left to stand for a period of time comprising 18 hours at a temperature of 50° F. The small hand-held calculator is tested for accuracy after the 18-hour period of time, said tests indicate that small hand-held calculator is rehabilitated.

EXAMPLE IV

In this example a bath is prepared by the mixture of 20.0 percent by weight of a paraffinic oil possessing a Saybolt Universal Second value of 100 at 100° F. as measured by ASTM test No. D-88, 30.0 percent by weight of p-xylene, 5.0 percent by weight of a salt formed from the reaction of 1 equivalent of N-tallow-1,3-propylenediamine with 1 equivalent of a mixture of fatty acids and polymerized olefinic acids having a carbon number of 36, commonly referred to in industry as VR-1 acid or D50 MEX acid, and 45.0 percent by weight of a coal tar naphtha possessing a boiling point of 320° F. Electrical equipment consisting of relays, switch gears, motor controls, motors and armatures are immersed in a salt water bath and subsequently left to stand for a period of time comprising 3 hours. After the completion of the 3-hour period of time, the electrical equipment is immersed in a vessel of clean fresh water 3 repetitive times within a 25 minute period of time. After treatment with clean fresh water, the electrical equipment is then immersed in the bath prepared as hereinbefore set forth for a period of time comprising 30 minutes at a temperature of 50° F. and a pressure of 1 atmosphere. At the end of this time, the electrical equipment is removed from the bath and left to stand for a period of time comprising 24 hours. After the passage of the 24-hour period of time, the electrical equipment is tested, said tests indicate that the equipment is rehabilitated.

I claim as my invention:

1. A method for the rehabilitation of water-damaged electrical equipment which comprises treating said equipment with a bath consisting essentially of an inert organic solvent, a paraffinic oil having a Saybolt Universal Second value of from 90 to 110 at 100°F., a polymethyl aromatic compound, and a salt selected from the group consisting of the reaction product of N-propyl-1, 3-propylenediamine with malonic acid, N-n-amyl-1, 3-propylenediamine with acetylene dicarboxylic acid, and N-n-butyl-1, 6-hexylenediamine with oxalic acid, and removing the resultant rehabilitated equipment from said bath.

2. The method of claim 1 further characterized in that the treatment conditions include a temperature of from about 35° F. to about 90° F. and a pressure of from about one atmosphere to about 100 atmospheres.

3. The method of claim 1 further characterized in that the paraffinic oil comprises from about 5.0 percent to about 40.0 percent by weight of the bath.

4. The method of claim 1 further characterized in that the polymethyl aromatic compound comprises from about 10.0 percent to about 29.0 percent by weight of the bath.

5. The method of claim 1 further characterized in that said salt comprises from about 1.0 percent to about 10.0 percent by weight of the bath.

6. The method of claim 1 further characterized in that the inert organic solvent comprises from about 40.0 percent to about 65.0 percent by weight of the bath.

7. The method of claim 1 further characterized in that the bath comprises 25.0 percent by weight of a paraffinic oil possessing a Saybolt Universal Second value of 100 at 100° F., 25.0 percent of p-xylene, 10.0 percent by weight of a salt formed from the reaction of one equivalent of N-propyl-1,3-propylenediamine with one equivalent of malonic acid, and 40.0 percent by weight of a coal tar naphtha possessing a boiling point of 320° F.

8. The method of claim 1 further characterized in that the bath comprises 13.5 percent by weight of a paraffinic oil possessing a Saybolt Universal Second value of 100 at 100° F., 29.0 percent by weight of o-xylene, 7.5 percent by weight of a salt formed from the reaction of one equivalent of N-n-amyl-1,3-propylenediamine with one equivalent of acetylene dicarboxylic acid, and 50.0 percent by weight of a coal tar naphtha possessing a boiling point of 320° F.

9. The method of claim 1 further characterized in that the bath comprises 20.0 percent by weight of a paraffinic oil possessing a Saybolt Universal Second value of 95 at 100° F., 20.0 percent by weight of pseudocumene, 10.0 percent by weight of a salt formed from the reaction of one equivalent of N-n-butyl-1,6-hexylenediamine with one equivalent of oxalic acid, and 50.0 percent by weight naphthalene.

10. The method of claim 1 further characterized in that the bath is applied to the water-damaged electrical euqipment through the utilization of an aerosol spray can.

* * * * *